Feb. 28, 1967 F. ZIMMER 3,305,923
METHODS FOR BONDING DISSIMILAR MATERIALS
Filed June 9, 1964
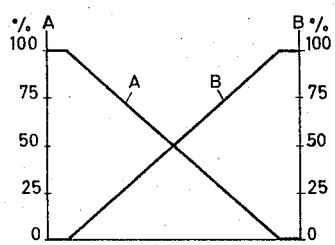
FIG. 1
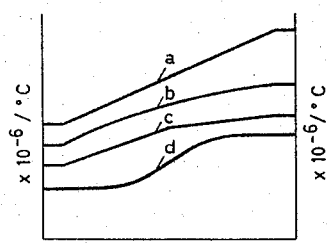
FIG. 2
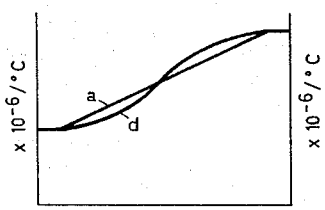
FIG. 3
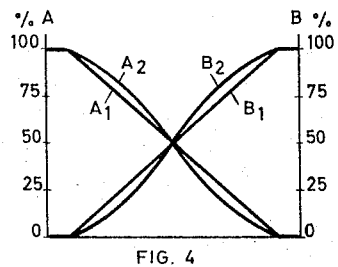
FIG. 4
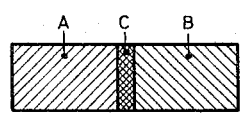
FIG. 6
FIG. 7
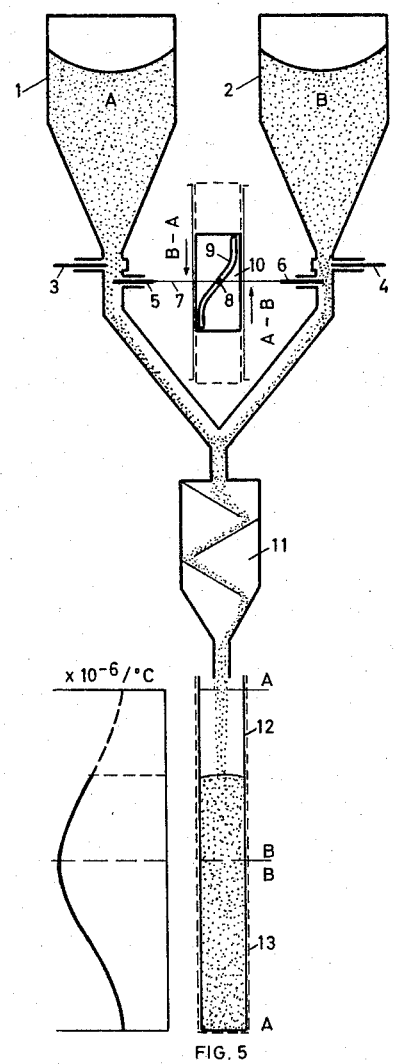
FIG. 5
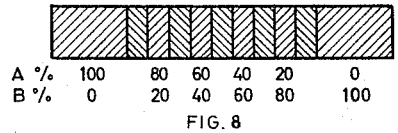
FIG. 8
FIG. 9

United States Patent Office 3,305,923
Patented Feb. 28, 1967

3,305,923
METHODS FOR BONDING DISSIMILAR MATERIALS
Frantisek Zimmer, Brussels, Belgium, assignor to Bureau d'Etudes Industrielles Fernand Courtoy, Brussels, Belgium, a Belgian limited company
Filed June 9, 1964, Ser. No. 373,638
10 Claims. (Cl. 29—528)

The present invention relates to improvements in the methods of making transition pieces used in bonding dissimilar materials such as metals, cermets and ceramics which have very different expansion coefficients.

It has previously been proposed by the present applicants to produce a transition piece by powder metallurgy, for joining two materials whose coefficients of expansion do not match.

Such a transition piece has a composition which is varied so that it has an expansion coefficient increasing in a continuously progressive manner from that of one material with a lower expansion coefficient to that of the other material with a higher expansion coefficient.

Therefore, both ends of the transition piece can be bonded to the two materials to be joined without stressing either of these latter materials. Furthermore, the difference between the expansion coefficients of any two adjacent sections in the transition piece is so small that there is no danger that any part of the assembly will fail under thermal stresses.

The transition pieces made by powder metallurgy have a wide field of applications. Nevertheless they have three serious drawbacks:

Large transition pieces (over 16 inches diameter) are difficult to compact and to sinter.

The application of powder metallurgy to the consolidation of complex alloys of refractory and/or reactive metals such as W, Mo, Ta, Nb, Zr, Ti, into satisfactory, homogeneous, sound transition pieces is very difficult. The complete placing into solution of all alloying elements in thick sections is almost impossible, and interstitial impurities (C, N, O, H) are not satisfactorily removed during either hydrogen or vacuum sintering.

Owing to the high contents of interstitial impurities, the pressed and sintered stock has unfavorable welding characteristics: gas porosity in the weld, sensitivity to cracking, embrittlement.

The above drawbacks of the powder metallurgy method can be overcome by the use of the vacuum arc and electron-beam melting for making ingots of predetermined variable composition which are transformed into transition pieces of the desired shapes.

In both methods, melting is done under high vacuum which not only affords protection from contamination, but also allows purification to be made by removal of volatile materials.

In both said methods, metal melts from the end of a consumable electrode, which is gradually consumed, while an ingot is formed and solidifies, layer by layer, in the copper water-cooled crucible.

In consumable arc furnaces the electrode is melted by means of the heat generated by an electric arc striking between the electrode end and the top of the ingot.

The electron-beam melting uses a powerful beam of electrons which are concentrated through a magnetic lens on to the surface of the electrode bar to be melted.

Because a small amount of metal is molten at a time, solidification is directional from the bottom of the ingot to the top. Such vertical crystal growth eliminates the central looseness and segregation patterns normally found in large ingots, conventionally cast. Consequently, the ingot has a very uniform and particularly favourable cast structure.

The production of ingots of predetermined variable composition by vacuum melting is effected as follows according to the present invention:

In vacuum arc or electron-beam furnace, a consumable electrode having a predetermined variable composition along its length is gradually melted to give an ingot having a composition distribution along its length related to that of the electrode.

The electric arc and the electron-beam are not the only sources of heat available for the production of ingots of variable composition according to the present invention. Other heat sources can be utilized for this purpose, for example induction heating, or plasma arc.

The high vacuum which protects the molten metal against contamination may be replaced for example by a protective atmosphere of argon or helium.

It is necessary that the ingot of variable composition shall be mechanically treated to destroy its cast structure. This is done by extrusion, or forging or rolling, which are also used to transform the ingot into transition pieces of the desired shapes: rods, tubes, sheets, strips, etc.

The production of the consumable electrode of variable composition can be done according to the present invention by different methods which will appear from the description which follows with reference to the accompanying drawings which are given by way of example only.

According to our experience, when two metals or two alloys A and B, of complete solid solubility, are mixed in a lineal manner as shown in FIG. 1, the expansion coefficient varies in different ways as shown in FIG. 2:

The line of expansion coefficient is lineal (a),
The line is slightly curved (b),
The line is composed of two straight lines (c),
The line is S-shaped (d).

It is obvious that the curve of S-shape (d) without any sharp change, is the most favourable to eliminate the dangerous thermal stresses.

Based on this experience, the methods to produce the consumable electrode of variable composition are:

I—powder metallurgy methods.
II—conventional metallurgy methods.

(I) When the powder metallurgy is used, the production comprises the following operations:

Preparation of two powders A and B having expansion coefficients, which match the expansion coefficients of dissimilar materials to be joined.

Prealloyed powders A and B or mixtures of powders of elements forming the composition A and B can be used.

Determination of the shape of the curve of expansion coefficient when the two powders A and B are mixed in a lineal manner (like in FIG. 1).

Mixing mechanically the two powders A and B in such a way that the curve of the expansion coefficient shall take the most favourable shape, that is the S-shape.

This can be done by the method which will appear from the description with reference to the accompanying drawings.

Referring to the drawings:

FIG. 3 is a diagram of the variation of the coefficient of expansion of the transition piece in a lineal manner (line a) and of S-shape (line d).

FIG. 4 is a diagram of mixing of powder A with the powder B in a lineal manner (lines A1–B1) and in an S-shape manner (curves A2–B2).

When the powders A and B mixed in a lineal manner have for example an expansion coefficient changing also in a lineal manner (FIG. 3, line a) then, when these powders are mixed in S-shape manner (FIG. 4, curves A2–B2), the expansion coefficient changes in an S-shape manner, too. (FIG. 3, curve *d*.) When the powders A and B mixed in a lineal manner have an expansion coefficient changing according to the curves *b* or *c* of FIG. 2, then a suitable way of mixing the two powders gives an expansion coefficient curve having the favourable S-shape.

This can be done automatically with the help of a mixing equipment represented diagrammatically in FIG. 5.

In this figure, a hopper 1 contains the powder A and a hopper 2 contains the powder B. The hoppers 1 and 2 are closed at their bases by means of slides 3 and 4 operated by hand. The mixing of the two powders A and B in a predeterminated manner is ensured by an automatic mixing mechanism comprising mainly two slides 5–6 opening or closing the passages for the powders A and B. These two slides are interconnected by a rod 7 which has a guiding knob 8 sliding in a groove 9 of S-shape made in a program plate 10. The program plate 10 moves up and down at a predetermined steady speed and regulates the flowing of the powders A and B in the desired proportions.

The metal powders are quite fluid and their flow can be improved by vibrators of any suitable known type.

The powders A and B mixed in the mixer 11 fall into a rubber container 12 located in a perforated metallic cylinder 13.

When the container is full of the mixed powders, it is hydrostatically pressed into a solid compact.

This is sintered under vacuum to give a consumable electrode. After possible machining, the consumable electrode is vacuum melted to give an ingot having a desired composition gradient along its length.

As shown in FIG. 5, it is possible to produce by the above method, ingots which can be divided along their length into two or more transition pieces.

In this case, the expansion coefficient of the ingot changes in a similar way to that of the consumable electrode shown in the diagram of FIG. 5. In this way, successive layers of powder mixtures A–B, B–A, A–B, and so on are formed.

The mixing A–B is done when the program plate 10 is moving up, and the mixing B–A, when the said plate moves down.

The hydrostatic compaction and vacuum sintering described are well suited for the production of the consumable electrodes of large diameter.

When the diameter is small (for example 1″), a continuous compaction and sintering capable of producing bars of unlimited length can be applied.

There are new techniques of electrode preparation in which powders are pressed, sintered and melted in one continuous operation.

In such a case, the top of the ingot remains at a constant level and the ingot is continuously extracted from the furnace without removal of the water-cooled crucible. In this way, a continuous production of ingots is achieved.

The combination of mixing powders by means of the equipment illustrated in FIG. 5 (1 to 11) and the described new technique of electrode preparation can be carried out without any difficulty to produce ingots of variable composition according to the present invention.

The modern electron-beam melting furnaces are capable of melting stock in electrode bar, powder, sponge or pellet form.

The possibility of converting directly metallic powder into ingot form is a very interesting characteristic of this type of vacuum furnace. Indeed, it allows of producing ingots of predetermined variable composition in an economical manner. This can be achieved in the following way:

The mixing equipment vacuum-sealed (FIG. 5 from 1 to 11) is connected with the furnace chamber into which the powder mixture is fed at a controlled rate.

The powder is continuously melted during its crossing the electron beam when it falls into the molten pool.

A significant advantage of electron beam melting is the ability to accurately control the partition of power between the feed stock and the molten pool.

This technique has the advantage of suppressing the electrode preparation.

II. Producing consumable electrode of variable composition by conventional metallurgy methods.

Experience has shown that when a consumable electrode composed of two parts A and B, of different compositions, welded together, as represented in FIG. 6, is vacuum melted, then the ingot (FIG. 7) has a zone of transition C in which the compositions change continuously from the composition of the part A to the composition of the part B.

Based on this phenomenon due to the mixing in the region of the molten pool is the preparation of the consumable electrode composed of several discs, which composition changes by steps from the composition A to the composition B.

In FIG. 8, the electrode comprises 9 intermediate discs. When such an electrode is melted, it gives an ingot the composition of which changes continuously and not in a stepwise fashion, and the coefficient of expansion changes also in a continuous manner.

The vacuum arc or electron beam melting forms a continuously flowing film of molten metal over the entire electrode end. This molten metal drops in the molten pool where it is thoroughly mixed and homogenized, before it solidifies, layer by layer into the ingot.

On this particularity of the vacuum melting is based the electrode composed of two pieces only: one of composition A and the other of composition B. The pieces A and B are joined together so that the cross-section of the two pieces joined together varies to give an ingot, the expansion coefficient of which varies in an S-shape manner.

When very high quality transition pieces are required, a double melting in a vacuum furnace can be applied.

It can be concluded that the described methods of making transition pieces by using vacuum arc and electron-beam melting have the following advantages over the production of the transition pieces made by powder metallurgy:

The size limitation is practically overcome. The dimensions of the transition pieces are limited only by the size of the water cooled crucible (crucibles with internal diameter greater than one yard are available).

Greater latitude in alloying, better homogeneity, lower possible interstitial contents and maximum density are assured and so, the production of the transition pieces having the highest metallurgical properties is rendered possible.

Favourable welding characteristics.

The coefficient of expansion of the transition piece changes along its length in the most favourable fashion (S-shape) to suppress the thermal stresses.

These advantages are particularly useful for producing large size transition pieces, difficult to make by the powder metallurgy method, when the following metal systems are used:

Metal systems based on refractory metals W, Mo, Ta, Nb, Cr, V and their alloys: W-Mo; W-Ta; W-Nb; Mo-Nb; Mo-Ta; Mo-Cr; Ta-Nb; Nb-V.

Metal systems based on reactive metals Hf, Zr, Ti, and their alloys: Hf-Zr; Hf-Ti-Zr-Ti.

Metal systems based on ferronickels, superalloys, (nickel-base alloys, cobalt-base alloys), austenitic steels:
Ferronickel-austenitic steel,
Ferronickel-superalloy,
Superalloy-austenitic steel.

What I claim is:

1. A method of producing a metallic transition piece for bonding two materials having substantially different coefficients of expansion; comprising, continuously melting a body of at least two metals having coefficients of expansion substantially different from one another and substantially the same as respective ones of said materials, and cooling the melted body of metals to form an ingot of continuously varying content of said metals whose coefficient of expansion varies continuously from the coefficient of expansion of one of said materials at one end to the coefficient of expansion of the other of said materials at the other end and as a smooth S-shaped function.

2. A method in accordance with claim 1 wherein the body of the two metals which is melted is a consumable electrode.

3. A method in accordance with claim 1 wherein the body of the two metals is melted by an electric arc.

4. A method in accordance with claim 1 wherein the body of the two metals is melted by an electron beam.

5. A method in accordance with claim 4 wherein the body of the two metals which is melted is in powder form.

6. A method in accordance with claim 1 wherein the body of the two metals is formed by forming a solid rod from a mixture of powders of said two metals and while continuously varying the composition of said mixture as a smooth S-shaped function varying from 100% of one of said metals to 100% of the other of said metals.

7. A method in accordance with claim 1 wherein the body of the two metals is a plurality of discs forming a rod whose content of said two metals changes progressively in stepwise fashion.

8. A method in accordance with claim 1 wherein the body of the two metals is said two metals joined together to form a rod in which the cross-section of each of said metals varies progressively along the length of said rod.

9. A method in accordance with claim 1 wherein the two metals are any two metals selected from one of the groups consisting of W, Mo, Ta, Nb, Cr, V, W-Mo; W-Ta; Mo-Nb; Mo-Ta; Mo-Cr; Ta-Nb, and Nb-V; Hf, Zr, Ti, Hf-Zr; Hf-Ti; and Zr-Ti; and ferronickels, superalloys and austenitic steels.

10. A method in accordance with claim 1 wherein the ingot is mechanically worked following its formation.

References Cited by the Examiner
UNITED STATES PATENTS

| | | | |
|---|---|---|---|
| 3,052,016 | 9/1962 | Zimmer | 29—504 X |
| 3,097,329 | 7/1963 | Siemens | 29—182.2 X |
| 3,109,235 | 11/1963 | Harris et al. | 29—504 X |
| 3,123,447 | 3/1964 | Zimmer | 29—504 X |
| 3,219,435 | 11/1965 | Gruber et al. | 75—10 |

HYLAND BIZOT, *Primary Examiner.*

DAVID L. RECK, *Examiner.*

H. F. SAITO, *Assistant Examiner.*